Jan. 16, 1940.　　　G. A. NOVAK ET AL　　　2,187,327
ORDER INDICATOR
Filed May 18, 1938　　　2 Sheets-Sheet 1
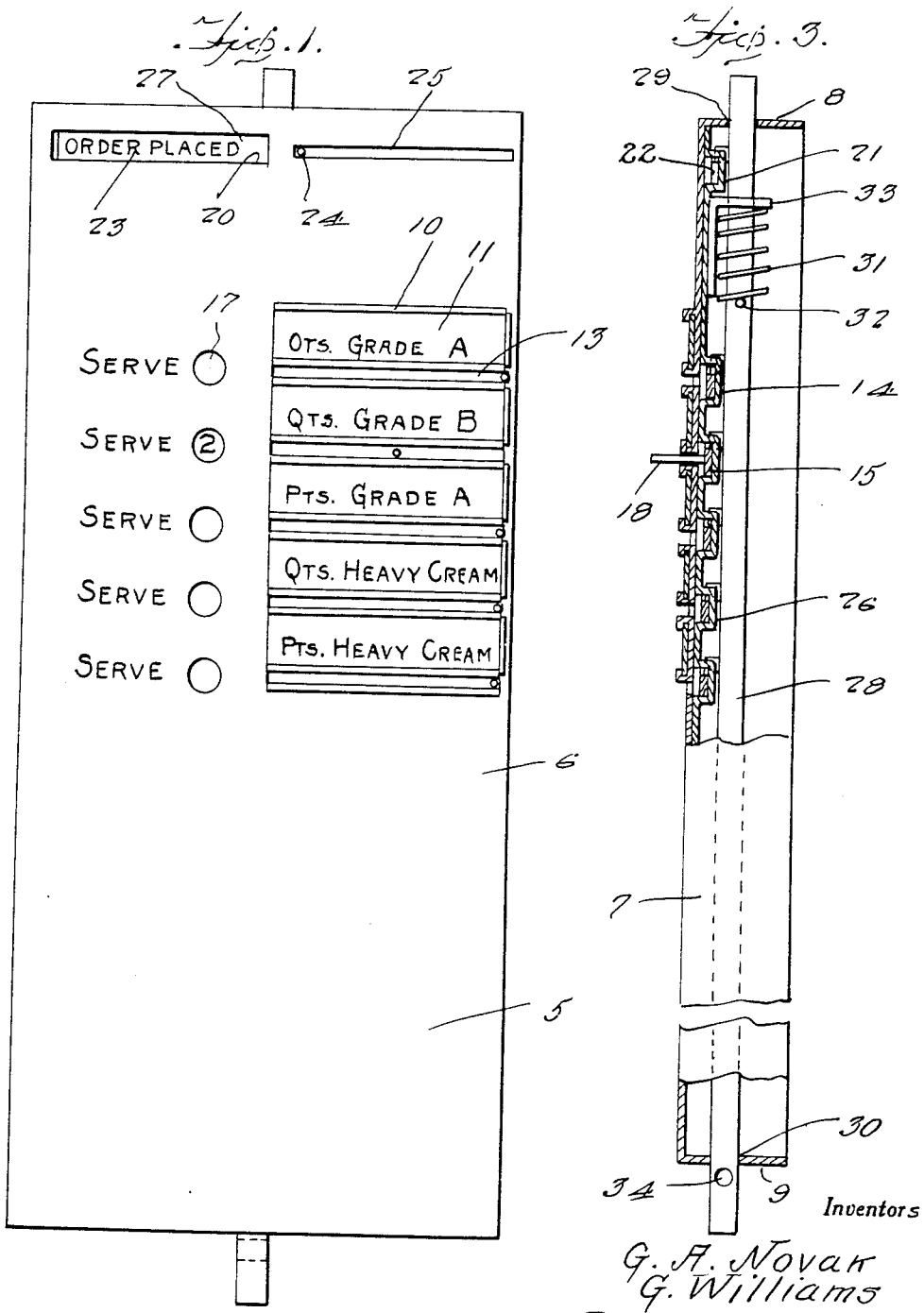
Inventors
G. A. Novak
G. Williams
By Clarence A. O'Brien
and Hyman Berman
Attorneys Jan. 16, 1940.   G. A. NOVAK ET AL   2,187,327
ORDER INDICATOR
Filed May 18, 1938   2 Sheets-Sheet 2
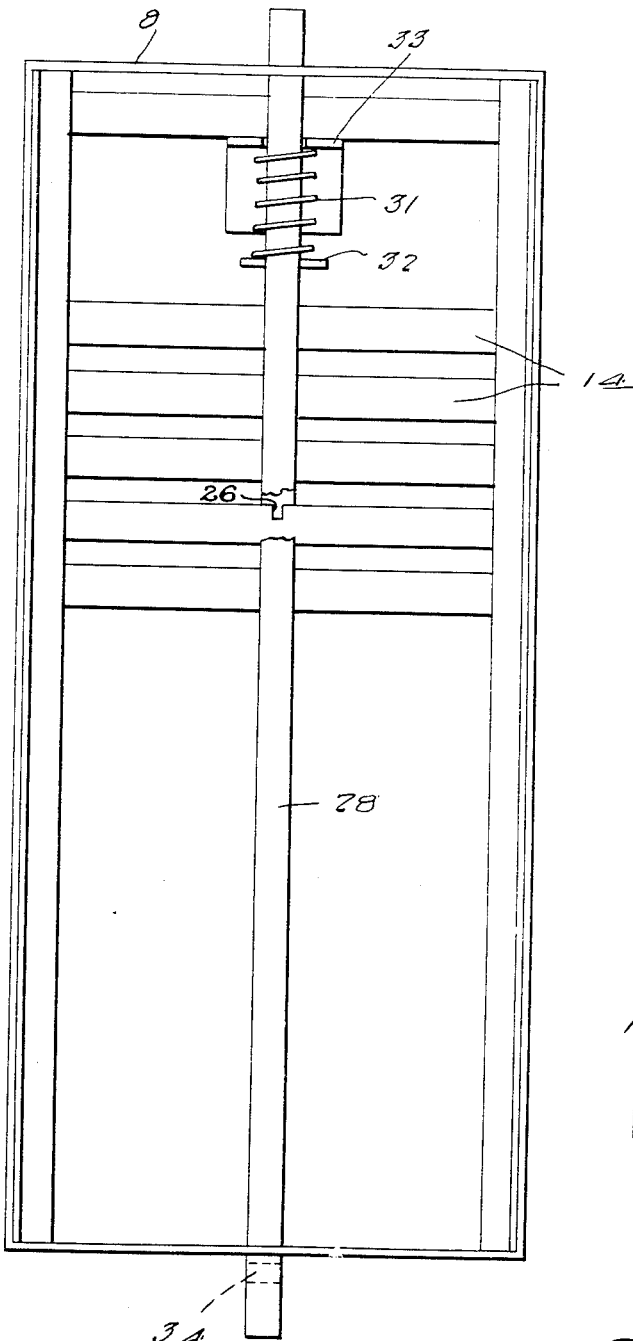
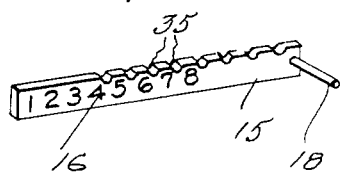
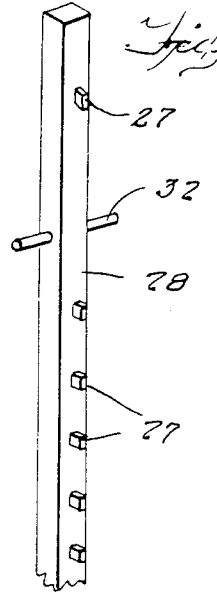
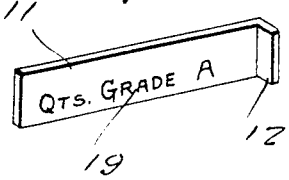
Inventors
G. A. Novak
G. Williams
By Clarence A. O'Brien
and Hyman Berman
Attorneys Patented Jan. 16, 1940

2,187,327

UNITED STATES PATENT OFFICE 2,187,327

ORDER INDICATOR

George A. Novak and George Williams, Greenwich, Conn.

Application May 18, 1938, Serial No. 208,675

3 Claims. (Cl. 116—135)

The present invention relates to indicating devices designed primarily by use by housewives, for use in ordering predetermined quantities of merchandise from deliverymen, such as milkmen and the like, and has for its primary object to provide a mechanical device of this character in which the desired quantity of goods may be indicated on a suitable rack and the parts locked in position to prevent tampering therewith.

A further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a front elevational view.

Figure 2 is a rear elevational view.

Figure 3 is a side elevational view with parts broken away and shown in section.

Figure 4 is a perspective view of one of the indicating slides.

Figure 5 is a fragmentary perspective view of the upper end of the locking rod, and Figure 6 is a perspective view of one of the removable indicating panels.

Referring now to the drawings in detail, wherein for the purpose of illustration I have disclosed a preferred embodiment of the invention, the numeral 5 designates a rack which includes a front wall 6, side walls 7 and top and bottom walls 8 and 9 respectively, the back of the rack being preferably open and adapted for positioning against the side of a door, house or other object.

The front 6 of the rack is provided with a plurality of channelled guides 10, the guides being arranged in spaced pairs and open at each end for slidably receiving panels 11, each of the panels having an end portion 12 bent angularly outwardly to form a finger grip.

Between each pair of guides 10 the front of the rack is formed with a slotted opening 13 and rearwardly of each slotted opening on the inside of the rack is arranged a guide 14 within which is slidably positioned a quantity ordering panel 15 having consecutively arranged numbers 16 printed or otherwise displayed on the face thereof. Each guide 14 is of substantially channel shape in cross section with the web thereof offset rearwardly with respect to the rear face of the rack 5, these guides forming guide housings for the panels 15, as shown in Figure 3.

The face of the rack 6, adjacent one end of each of the slots 13 is also provided with window openings 17 with which the numbers 16 are adapted to register upon the horizontal sliding movement of the panels 15. Each of the panels 15, adjacent one end thereof, is provided with an outstanding pin 18 which projects forwardly from the face of the rack through the slot 13 for slidably manipulating the panels 15 in a manner as will be apparent.

Each of the panels 11 are provided with indicia 19 designating certain articles of merchandise and by the manipulation of the panel 15 associated with the respective panels 11, the desired quantity of such merchandise may be indicated through the window opening 17.

A slotted opening 20 is also formed in the face of the rack adjacent the upper portion thereof, behind which is arranged a guide housing 21 of substantially channel shape in cross section with its web offset rearwardly with respect to the rear face of the rack and this guide housing slidably receives a panel 22 carrying desired information such as indicated at 23 for registering in the slotted opening. The panel 22 is also provided with a manipulating pin 24 working in a slot 25.

Each of the guides 14 and 21 in the upper edges thereof, is provided with a notch 26 adapted to receive lugs 27 formed on a locking bar 28. The panels 15 and 22 are also provided with notches 35 adapted to register with the openings 26 of the guides 14 and 21 in order that the lugs 27 will enter the notches to secure the panels against movement.

The locking bar 28 is slidably positioned in openings 29 and 30 formed respectively in the upper and lower walls of the rack and is yieldably held in locking position by means of a coiled spring 31 positioned on the bar, said spring having its lower portion contacting a pin 32 projecting laterally from the bar and having its upper end contacting a bracket 33 secured to the inner surface of the rack as more clearly shown in Figure 3 of the drawings.

The lower end of the bar projects outwardly beyond the rack and is formed with an opening 34 within which a padlock may be inserted for locking the bar against manipulation.

It is believed the manner of operation of the device as well as the details of construction thereof, will be readily understood from the foregoing without further detailed explanation.

Having thus described the invention, what we claim is—

1. In a device of the class described, a plate-like member having a window opening therein, a channel-shaped guide housing on the rear face of said member and having its web offset rearwardly with respect to the rear face of the plate-like member, said housing having a portion extending across the window opening, a substantially flat elongated panel slidably arranged in the housing and having indicia thereon for appearance through the window opening, the upper edge of said panel having spaced notches therein and said housing having an opening in its top part, a locking bar slidably arranged on the back of the plate-like member and in rear of the housing and a lug on the bar extending through the opening in the top of the housing and engaging a notch in the panel when the locking bar is in lowered position for holding the panel against sliding movement until the locking bar is raised.

2. An order indicator comprising a rack of plate-like form and having a vertical row of window openings therein and a vertical row of transversely extending slots therein, each slot being located opposite a window opening, a plurality of channel-shaped guide housings attached to the rear face of the rack and extending transversely of the rack and each housing having its web offset rearwardly with respect to the rear face of said rack and each housing passing across a window opening and a slot, a substantially flat elongated panel slidably arranged in each housing and having indicia thereon for appearance at a window opening, a pin connected with each panel and passing through a slot, the upper edge of each panel having a plurality of spaced notches therein and the upper portion of each housing having an opening therein, a vertically arranged locking bar slidably supported at the rear of the rack and in rear of the housings, projections on the bar passing through the openings in the housing, when the bar is in lowered position and engaging notches in the panels for holding the panels against sliding movement.

3. An order indicator comprising a rack of plate-like form and having a vertical row of window openings therein and a vertical row of transversely extending slots therein, each slot being located opposite a window opening, a plurality of channel-shaped guide housings attached to the rear face of the rack and extending transversely of the rack and each housing having its web offset rearwardly with respect to the rear face of said rack and each housing passing across a window opening and a slot, a substantially flat elongated panel slidably arranged in each housing and having indicia thereon for appearance at a window opening, a pin connected with each panel and passing through a slot, the upper edge of each panel having a plurality of spaced notches therein and the upper portion of each housing having an opening therein, a vertically arranged locking bar slidably supported at the rear of the rack and in rear of the housing, projections on the bar passing through the openings in the housings, when the bar is in lowered position and engaging notches in the panels for holding the panels against sliding movement, and spring means for normally holding the bar in lowered position.

GEORGE A. NOVAK.
GEORGE WILLIAMS.